US008606719B2

(12) United States Patent
Oliver et al.

(10) Patent No.: US 8,606,719 B2
(45) Date of Patent: Dec. 10, 2013

(54) SYSTEM FOR MANAGEMENT OF ALTERNATIVELY PRICED TRANSACTIONS ON NETWORK

(75) Inventors: David M. Oliver, Owego, NY (US); William P. Densmore, Williamstown, MA (US); Michael J. Callahan, Berkeley, CA (US)

(73) Assignee: Clickshare Service Corp., Williamstown, MA (US)

( * ) Notice: Subject to any disclaimer, the term of this patent is extended or adjusted under 35 U.S.C. 154(b) by 785 days.

(21) Appl. No.: 12/021,706

(22) Filed: Jan. 29, 2008

(65) Prior Publication Data

US 2008/0183628 A1 Jul. 31, 2008

Related U.S. Application Data

(60) Continuation of application No. 09/599,163, filed on Jun. 22, 2000, now Pat. No. 7,324,972, which is a division of application No. 09/036,236, filed on Mar. 6, 1998, now abandoned.

(60) Provisional application No. 60/040,223, filed on Mar. 7, 1997.

(51) Int. Cl.
*G06Q 30/00* (2012.01)

(52) U.S. Cl.
USPC .................. 705/69; 705/26; 705/27; 705/39; 705/40; 705/52

(58) Field of Classification Search
USPC ................ 705/26, 27, 39, 40, 52, 59, 69
See application file for complete search history.

(56) References Cited

U.S. PATENT DOCUMENTS

| | | | |
|---|---|---|---|
| 4,528,643 A | 7/1985 | Freeny, Jr. |
| 4,551,581 A | 11/1985 | Doughty |
| 4,879,742 A | 11/1989 | Taniguchi et al. |
| 4,920,533 A | 4/1990 | Dufresne et al. |
| 4,980,886 A | 12/1990 | Bernstein |
| 5,012,469 A | 4/1991 | Sardana |
| 5,050,213 A | 9/1991 | Shear |
| 5,148,479 A | 9/1992 | Bird et al. |
| 5,220,655 A | 6/1993 | Tautsui |
| 5,241,594 A | 8/1993 | Kung |

(Continued)

OTHER PUBLICATIONS

Exhibit O, "Clickshare (sm) alpha up; test drives available", Newshare Corp. Release, Oct. 26, 1995.*

(Continued)

*Primary Examiner* — Nga B. Nguyen
(74) *Attorney, Agent, or Firm* — Karl F. Milde, Jr.; Eckert Seamans Cherin & Mellott, LLC (57) ABSTRACT

A system and method thereof, comprising means for: communicating through at least one computer network interface with each of (i) a plurality of providers of accountable resources, and (ii) a plurality of registrars which register clients, each client having access to accountable resources of providers, and maintain client-associated accounts therewith; generating a token verifying that a client is authenticated by a registrar; logging accountable transactions identifying a client-associated account and a transaction valuation, maintained by the registrar; and periodically accounting for the logged accountable transactions between respective registrars and respective providers; wherein a valuation of the accountable transaction is dependent at least on information conveyed in the token.

20 Claims, 2 Drawing Sheets

(56) References Cited

U.S. PATENT DOCUMENTS

| | | | |
|---|---|---|---|
| 5,249,230 A | 9/1993 | Mihm, Jr. | |
| 5,359,508 A | 10/1994 | Rossides | |
| 5,406,555 A | 4/1995 | Yoshida | |
| 5,410,598 A | 4/1995 | Shear | |
| 5,418,844 A | 5/1995 | Morrisey et al. | |
| 5,475,758 A | 12/1995 | Kikuchi | |
| 5,506,961 A | 4/1996 | Carlson et al. | |
| 5,517,562 A | 5/1996 | McConnell | |
| 5,560,008 A | 9/1996 | Johnson et al. | |
| 5,666,416 A | 9/1997 | Micali | |
| 5,671,283 A | 9/1997 | Michener et al. | |
| 5,684,950 A | 11/1997 | Dare et al. | |
| 5,684,951 A | 11/1997 | Goldman et al. | |
| 5,689,638 A | 11/1997 | Sadovsky | |
| 5,706,427 A | 1/1998 | Tabuki | |
| 5,712,979 A | 1/1998 | Graber et al. | |
| 5,715,314 A * | 2/1998 | Payne et al. | 705/78 |
| 5,715,403 A | 2/1998 | Stefik | |
| 5,717,860 A | 2/1998 | Graber et al. | |
| 5,724,424 A | 3/1998 | Gifford | |
| 5,729,594 A | 3/1998 | Klingman | |
| 5,740,252 A | 4/1998 | Minor et al. | |
| 5,757,917 A | 5/1998 | Rose et al. | |
| 5,757,920 A | 5/1998 | Misra et al. | |
| 5,768,385 A | 6/1998 | Simon | |
| 5,768,521 A | 6/1998 | Dedrick | |
| 5,774,551 A * | 6/1998 | Wu et al. | 713/155 |
| 5,778,182 A | 7/1998 | Cathey et al. | |
| 5,794,221 A | 8/1998 | Egendorf | |
| 5,815,665 A * | 9/1998 | Teper et al. | 709/229 |
| 5,819,092 A | 10/1998 | Ferguson et al. | |
| 5,845,267 A | 12/1998 | Ronen | |
| 5,848,412 A * | 12/1998 | Rowland et al. | 1/1 |
| 5,852,812 A * | 12/1998 | Reeder | 705/39 |
| 5,873,069 A | 2/1999 | Reuhl et al. | |
| 5,881,234 A | 3/1999 | Schwob | |
| 5,884,284 A | 3/1999 | Peters et al. | |
| 5,889,958 A | 3/1999 | Willens | |
| 5,899,980 A | 5/1999 | Wilf et al. | |
| 5,909,492 A | 6/1999 | Payne | |
| 5,941,947 A * | 8/1999 | Brown et al. | 709/225 |
| 5,987,480 A * | 11/1999 | Donohue et al. | 715/207 |
| 6,006,333 A * | 12/1999 | Nielsen | 726/8 |
| 6,098,081 A * | 8/2000 | Heidorn et al. | 715/200 |

OTHER PUBLICATIONS

Exhibit L, "Questions often asked by prospective Clickshare publishers", Newshare Release, Copyright 1995.*
Hostetler et al., "A Proposed Extension to HTTP: Digest Access Authentication", Mar. 10, 1995.*
Evans, Washington Post Staff Writer, "Compuserve to Begin Shift to World Wide Web", On-Line Pioneer Trying to Reclaim Leadership, May 1996, 2 pages.
Haller, et al., "The S/Key One-Time Password System", http://www.ietf.org/rfc/rfc1760.txt, Feb. 1995.
Franks, et al., "An Extension to HTTP: Digest Access Authentication", http://www.ics.uci.edu/pub/ietf/http/rfc2069.txt, Jan. 1997.
Franks, et al., "HTTP Authentication: Basic and Digest Access Authentication", http://www.ics.uci.edu/pub/ietf/http/rfc2617.txt, Jun. 1999.
Record of Oral Hearing dated May 6, 2010 in U.S. Appl. No. 09/036,236.
Decision on Appeal dated Jun. 8, 2010 in U.S. Appl. No. 09/036,236.
Decision on Request for Rehearing dated Feb. 14, 2011 in U.S. Appl. No. 09/036,236.

* cited by examiner

SYSTEM FOR MANAGEMENT OF ALTERNATIVELY PRICED TRANSACTIONS ON NETWORK

CROSS-REFERENCE TO RELATED APPLICATIONS

This application is a continuation of U.S. application Ser. No. 09/599,163, filed Jun. 22, 2000, now U.S. Pat. No. 7,324, 972 issued Jan. 29, 2008, which is a division of copending U.S. application Ser. No. 09/036,236, filed 6 Mar. 1998, which claims the benefit under 35 U.S.C. §119(e) of U.S. Provisional Application No. 60/040,223 filed Mar. 7, 1997, each of which are hereby incorporated by reference. The present application is also related to U.S. application Ser. No. 09/505,462, filed Feb. 11, 2000, now abandoned.

COPYRIGHT REFERENCE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

This invention has been created without the sponsorship or funding of any federally sponsored research or development program.

REFERENCE TO MICROFICHE APPENDIX

This application includes a microfiche appendix in accordance with 37 C.F.R. 1.96(c) comprising ten (10) microfiche having a total of 600 frames. The appendix was filed in U.S. patent application Ser. No. 09/036,236 filed 6 Mar. 1998, and is hereby incorporated by reference.

The appendix contains a source tree for programs embodying the present invention including: the National Center for Supercomputing Applications httpd 1.4.2 web server with customizations in accordance with the present invention, the "cs-log" and "cs-logd" logging daemons in accordance with the present invention; and the "tvsd" token-management daemon according to the present invention.

BACKGROUND OF THE INVENTION

The open-systems Internet offers a very different environment to users when compared with traditional consumer on-line services and Electronic Data Interchange (EDI) value-added networks (VANs). Specifically, the Internet environment is very decentralized, and no one organization controls the user base or access to resources. While this decentralization has tremendous advantages (chief among them, the freedom to select from a wide number of service and content offerings), this lack of "unity" can confuse and sometimes frustrate both potential information providers and users. In addition, the "stateless protocol" of the Internet presents difficulties for entities which need to know the identity and usage requirements of their service clients.

A challenge is to provide a more unified user-access environment without destroying the freedom of choice inherent in the Internet model. One aspect of this challenge is that the unlimited variety of kinds of transactions which occur on the Internet include some kinds of transactions which are very difficult to manage cost-effectively. One such kind is the low-priced transaction.

The prior art systems and methods for managing transactions on networks have been too complex and too expensive to use effectively on low-priced transactions. These and other difficulties experienced with the prior art systems and methods have been obviated in a novel manner by the present invention.

It is, therefore, an outstanding object of the present invention to provide a system and method for managing transactions on networks.

Another object of this invention is to provide a system and method for managing transactions on networks which is so simple and so inexpensive to use that it can be effectively used to manage low-priced transactions.

A further object of the present invention is to provide a system for managing client accounts and controlling access to resources over data networks.

It is another object of the invention is to provide a system which provides a mechanism for sharing client information and charges among a plurality of service providers.

A still further object of the invention is to provide a system which includes a client who is registered with one of the service providers (the "home provider") and is allowed to access the resources of the other service providers ("outside providers") that are part of the system.

It is a further object of the invention to provide a system which includes a settling means adapted to allow the system to settle accounts among service providers by charging the home provider for access by its clients to the resources of the outside providers.

It is a further object of the invention to provide a system which includes a payment means adapted to assure that the outside providers are then paid for access through the system.

It is a further object of the invention to provide a system which includes a sharing means adapted to allow the system to allow the providers to share users without requiring an open account for each user at each provider.

It is a further object of the invention to provide a system which includes a verification means adapted to allow each provider to determine if a particular client is a member of the system, verify that the client has authenticated at his home provider, and determine this client's access privileges and criteria.

It is a further object of the present invention to provide a system for identifying client users for a variety of purposes including personalization and audience measurement.

It is a further object of the invention to provide a system and method for managing transactions on networks which is capable of being developed of high quality and at a low cost, and which is capable of providing a long and useful life with a minimum of maintenance.

With these and other objects in view, as will be apparent to those skilled in the art, the invention resides in the combination of parts and steps set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION 1.0. This document describes the Token Validation Service (TVS) user and access management environment. Clickshare identifies the operator of the system. TVS is:

1.1. A system for managing client accounts and controlling access to resources over data networks which includes a mechanism for sharing client information and charges among a plurality of service providers. A client who is registered with one of the service providers (the "home provider") is allowed to access the resources of the other service providers ("outside providers") that are part of the system. The system settles accounts among service providers by charging the home provider for access by its clients to the resources of the outside providers. The outside providers are then paid for that access through the system. Thus, the system allows the providers to share users without requiring an open account for each user at each provider. The system includes a mechanism by which each provider can determine if a particular client is a member of the system, verify that the client has authenticated at his home provider, and determine this client's access privileges and criteria.

TVS is a service for validating and profiling a large base of users distributed across independent content providers, simultaneously supporting content usage verification ("audience measurement") and billing at the "micro-transaction" ("per-page") level.

TVS is designed for use in an open-systems, public-network environment such as the Internet. TVS is implemented using an object-oriented client/server approach to enhance both scalability (in terms of number of users and number of transactions) and portability among operating environments.

TVS servers are operated by any Clickshare-authorized licensee of the server-side software The "clients" of this service are, currently, HyperText Transfer Protocol (HTTP) servers operated by licensed, but otherwise independent, content providers. HTTP is the supporting protocol for the World Wide Web, the Internet's popular user environment.

Using TVS, content providers can "share users" through a common validation/profiling technique and exchange value for their content through a common, background, settlement process. By permitting owners of content to collect royalties and receive commissions automatically, TVS creates the economic incentive for content providers to link to each other's content in a manner that leverages the content base of all providers simultaneously, and is completely transparent to the user.

A "TVS enabled" HTTP reference server running on the Unix™ operating system was developed.

Clickshare provides a "reference implementation" of the TVS client based on the 1.4.2 release of the HTTP server from the National Center for Supercomputing Applications (NCSA)—a well-understood public domain HTTP server that runs on many versions of the Unix™ operating system (including "free" Linux). This "TVS-enabled" HTTP server is written in the C programming language. The TVS service is available through a C language API with a clean and narrow interface to the original HTTP server code. The API is a fully separate library and can be used to build other implementations.

BRIEF DESCRIPTION OF THE DRAWINGS 2.0. The character of the invention, however, may best be understood by reference to one of its structural forms, as illustrated by the accompanying drawings, in which.

Figure 1:
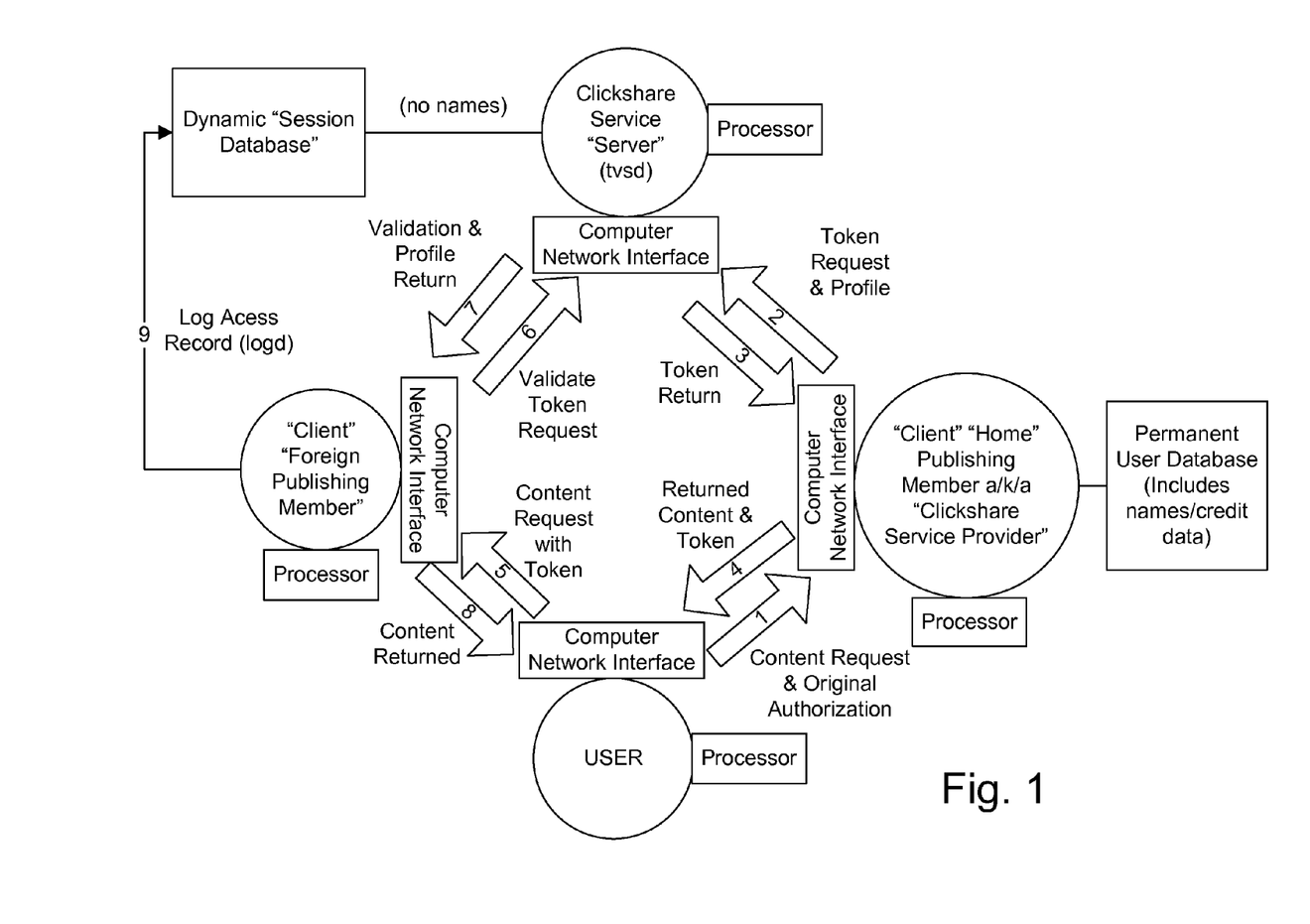
FIG. 1 is a diagrammatic representation of a simple version of a system for management of transactions over a network, which system embodies the principles of the present invention.

DETAILED DESCRIPTION OF THE INVENTION 3.0. As shown in FIG. 1, the invention may, in general, display the following features, in, for example, the following order:
Content Request and Original Authorization 1
Token Request & Profile 2 Token Return 3
Returned Content & Token 4
Content Request with Token 5
Validate Token Request 6
Validation & Profile Return 7
Content Return 8
Log Access Record (logd) 9

Figure 2:
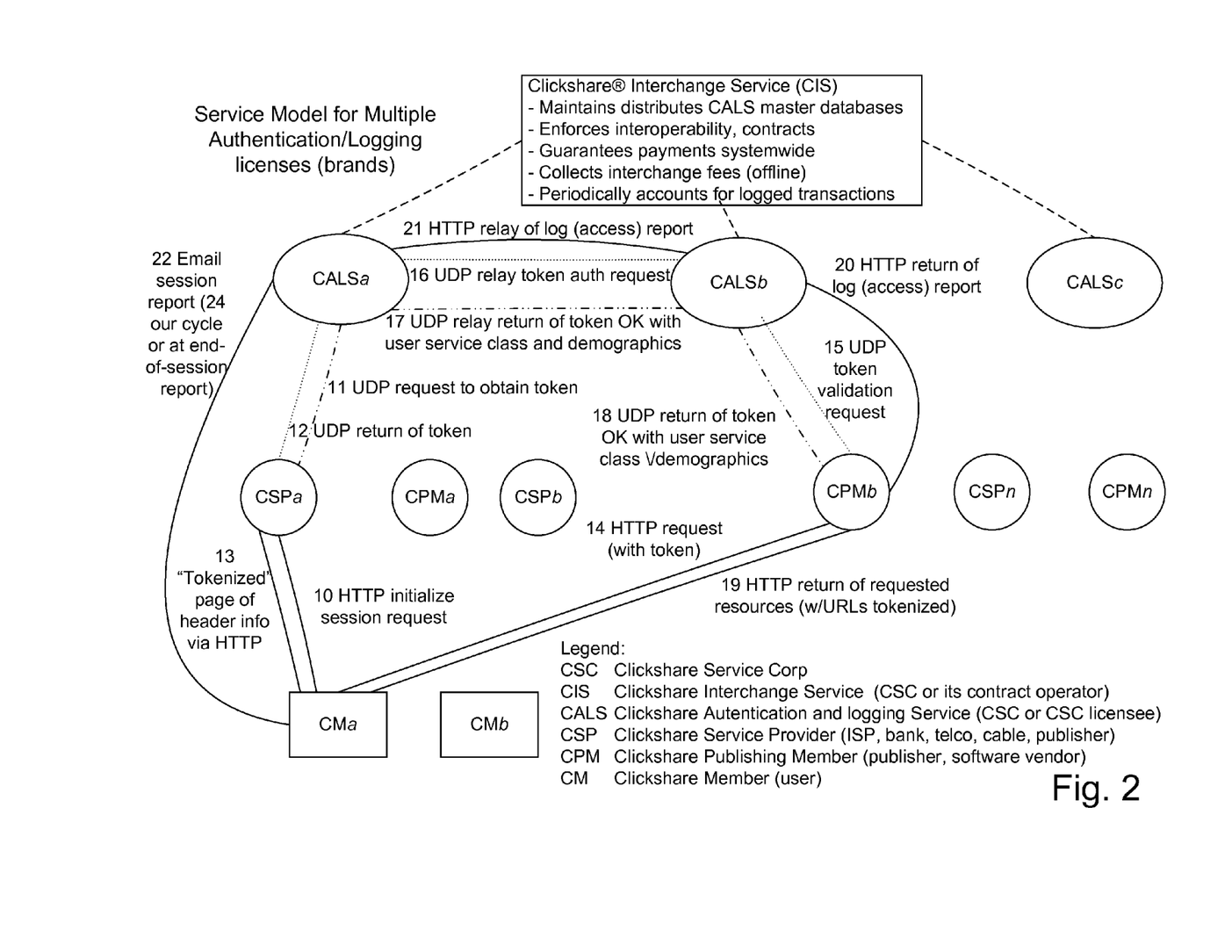
FIG. 2 is a diagrammatic representation of a more complex version of a system for management of transactions over a network, which system embodies the principles of the present invention.

In one preferred embodiment, as shown in FIG. 2, the invention may display the following features:
HTTP initiate session request 10
UDP request to obtain token 11
UDP return of token 12
"Tokenized" page of header info via HTTP 13
HTTP request (with token) 14
UDP token validation request 15
UDP relay token auth request 16
UDP relay return of token OK with user service class and demographics 17
UDP return of token OK with user service class/demographics 18
HTTP return of requested resource (w/URLs tokenized) 19
HTTP return of log (access) report 20
HTTP relay of log (access) report 21
Email Session report 22

3.1. Commercial Purpose of Invention

The Clickshare/TVS Service is a distributed user-management service for Internet information micropayments, access control, audience measurement and personalization with one-ID, one-bill user convenience. It is designed to address the problem of how to charge Internet users for their use of resources and control their access to those resources. It is also designed to provide for the transfer of information about users among multiple web sites in order to control access or define service authorization. TVS enables:

MICROPAYMENTS—It makes it possible for publishers, and information or software owners to sell easily to Internet consumers in units as little as 10 cents per item—so called "micropayments".

PERSONALIZATION—It allows consumers to store their custom information preferences as part of their user profile and then optionally give those preferences to web publishers who wish to personalize their offerings. Clickshare's "Digital Calling Card" technology makes this possible.

ACCESS CONTROL—It permits a web site to differentiate requests for information by individual users rather than broad domains—even if the user has never registered with that particular web site. This "Service Class" technology avoids users having to maintain multiple IDs and passwords.

AUDIENCE MEASUREMENT—Advertisers want to measure the effectiveness of their pitches by knowing as much about individual viewers as possible. Basic Internet protocols identify users only by "domain." Clickshare's "Digital Calling Card" technology transfers a unique identifier for each user worldwide. This creates a platform for fine-grained demographic analysis while protecting user privacy.

EASE OF USE—The consumer can leverage a single billing relationship with a "most-trusted" Clickshare Service Provider—such as an ISP, telco, cable company or other billing entity—to purchase information at multiple web sites with single-ID and password convenience. No end-user software is required beyond a standard Web browser. 3.2. Parties Involved in Service The parties involved in the Clickshare/TVS Service include:

INFORMATION SELLERS/RESOURCE PROVIDERS—Operators of World Wide Web sites who wish to make money from the sale of information or software, or wish to control access to resources. These are called Clickshare Publishing Members or Clickshare Resource Providers. Examples include: newspapers, magazines, specialty publications, new-media entrepreneurs, game vendors, software publishers, health-care providers, network or other service providers.

BILLING AGENTS/SERVICE PROVIDERS—Consumers have preexisting, ongoing credit relationships with billing agents or service providers who agree to become Clickshare Service Providers. In exchange for a negotiated share of the "Clickstream" revenue from information sales, or for other consideration, these service providers assume responsibility for servicing and billing consumer or enterprise end users and for authenticating the user at the start of a Clickshare/TVS session. Examples include: Internet Service Providers, newspapers, specialized publishers, online services, telephone companies, cable and utility companies, credit-card issuing banks, health-care providers, retailers, other consumer-credit entities, network or other service providers and other enterprises.

CUSTOMERS/END USERS—Internet users who have established an account with a billing agent and who seek convenient access to widely distributed digital information are called Clickshare Users. They are customers of their billing agent and have no direct relationship with Clickshare Corp.

CLICKSHARE SERVICE CORP.—Facilitating the authentication of Clickshare Users, and storing records of their access to web sites is the Clickshare Access and Logging Service (CALS). Operated by Clickshare Service Corp. or its licensees, CALS is a fault-tolerant network of one or many Internet servers which exchange real-time, encoded information with machines operated by information sellers and billing agents.

3.4 Value of Service to Participants

Information Sellers

A way to get paid for selling information on the Internet

A third revenue stream after advertising and subscriptions

A digital equivalent of "single-copy sales"

Can provide user demographic and preference information with user consent

Enhances customer service through ability to personalize

Enables site access by service class such as subscriber only

Produces auditable, third-party "page-view" data for advertisers

Low entry barrier, pay-as-you-profit cost structure

Billing Agents

A new revenue stream—selling information instead of access or goods

Low entry barrier, pay-as-you-profit cost structure

Leverage existing billing facility for profits at little incremental cost

Provides credibility and co-marketing strength of an affiliate relationship

Source of data on where customers are going for information

Solidifies billing agent as "home page" for customer

Customer

Convenience of single ID and password for information access anywhere on Web

Single billing relationship for buying anywhere on the Web

Choice of billing agents

Ease of payment through single, periodic bill via existing credit facilities

Requires no special end-user software and no new end-user credit relationship

Instant point-and-click purchasing with authentication in background

No transfer of credit-card information across the Internet

Total control of who can use personal information

User's address optionally protected from unwanted mail

Parental control built and regulated by publisher not by government

Option for nightly tally of information purchases

Clickshare Service Corp.

Front-loaded revenues from CPM and CSP member enrollment fees

Cost-based revenues from per-enabled-user fees

Scaled, annuity revenue from per-click transaction fees

Service fees for audience measurement data, installation and support

Commissions on advertising sales (Adshare—pay-per-view ads)

3.3. Objective System Benefits

UNIVERSAL SETTLEMENT—Publishers and on-line services have begun exploring ways to compensate each other for the services they provide to users [Advertising Age, Jan. 20, 1997, "Pay per view: Web sites seek deals with ISPs"]. Such contractual relationships will rapidly become unmanageable because of the variety of sources of information and users and the need to have bilateral agreements among players. A single settlement facility, as with the long-distance telephone industry, is needed. Also, if users are forced to join information cartels of large publishers or user-owners, they will be denied choice and will be forced to accept bundled pricing.

UNIVERSAL CREDIT—Many web sites are enrolling users and accepting credit-card payments. But each of these relationships works only for that web site, much as a store-credit card issued by Sears, does not work at Target or Pennies. The experience in the consumer credit industry of a gradual conversion of most such accounts to VISA or MasterCard-backed systems demonstrates the desire for consumers and marketers to have less credit facilities rather than more which are universal in their application.

UNIVERSAL ACCESS—Publishers who seek to charge users on a subscription basis by definition exclude the vast majority of potential users who would buy a portion of the web site's offerings on a "per-click" basis. Clickshare, uniquely, offers the opportunity to "have it both ways." Just as conventional newspaper and magazine publishers have subscribers and single-copy sales, the Clickshare publisher can have subscribers, but also vend information to visiting Clickshare users "by the click." In the proprietary online world (West, Lexis-Nexis, Compuserve, Knight-Ridder-Dialog) this has not been technically feasible because of the lack of a universal public network, such as the Internet, that takes care of site access. Clickshare provides the vicarious billing relationship.

4. Objectives of the Invention 4.1. Summary

The Clickshare/TVS Service is designed to enable a free marketplace for digital information in which business relationships among multiple service providers are reduced to a set of technical protocols providing for significant flexibility in the pricing of resources, the transfer of user attributes and the control of access to system resources, all on a real-time basis across open networks such as the Internet.

4.2. Overview

The open-systems Internet offers a very different environment to users when compared with traditional consumer on-line services and Electronic Data Interchange (EDI) value-added networks (VANs). Specifically, the Internet environment is very decentralized, and no one organization controls the user base or access to resources. While this decentralization has tremendous advantages (chief among them, the freedom to select from a wide number of service and content offerings), This lack of "unity" can confuse and sometimes frustrate both potential information providers and users. In addition, the "stateless protocol" of the Internet presents difficulties for entities which need to know the identity and usage requirements of their service clients.

A challenge is to provide a more unified user-access environment without destroying the freedom of choice inherent in the Internet model. Clickshare's effort in this arena is called the Clickshare/TVS Service—a network service that allows independent content and service providers to cooperate on user registration, user profiling and verification of site usage in a manner that allows:

(a) Cross-site usage to be billed at the micro-transaction (per-page) level (that is, "settled") if/when desired;
(b) Delivery of resources and the control of access according to the verified and submitted characteristics of the requesting user;
(c) Transfer of data about user characteristics, including levels of authorization and service classes, among multiple service providers.
(d) Central logging of access by users to system resources among multiple service providers for billing or other user-management or demographic purposes.
(e) Transfer of pricing relationships or data among original publishers of information, including software, and their billing or sales agents or brokers.

TVS does not require changes to the user "client" software (i.e. web browsers), and does not negatively impact any of the several credit-card and e-cash transaction facilities being deployed or discussed. Rather, it is designed to enable a class of transactions in a value range (5 cents and up) that is uneconomic as single credit-card purchases—and bundle them for monthly or weekly settlement. Thus, TVS is compatible with most announced e-cash implementations.

4.3. Key Design Features

4.3.1. Client Independent, Transparent to Users

One method of unifying the Internet is to create a single application or application suite that accesses all services, then attempt to get all users to use it exclusively, possibly using proprietary features that users want (but other vendors can't copy). Instead, the TVS approach is have low impact on client software, and where impact is required, adherence to Internet standards. TVS is transparent to users in that it does not introduce impediments into usage of Internet services (specifically, in its first offering, the World Wide Web), and has minimal performance impact.

4.3.2. Scalable Service, Capable of High Volume of Users and Usage Traffic

Internet usage is predicted to grow dramatically as high-quality and exciting services are made available on the Internet. TVS is designed to scale as the number of content providers, users, and exciting services are made available on the Internet. TVS is designed to scale as the number of content providers, users, and content usage increases. Scaling capability is built into all portions of the system including user registration, user authentication, and usage logging.

4.3.3. Maintains Distributed, Local Control of the User Base

Clickshare believes that centralization of the user base for the purpose of unified registration, profiling, or measurement is a potentially non-scalable, performance-limiting approach to user management. In the TVS system, the user base is managed at the "local" (publisher/service provider) level. This has technical; sociological and financial advantages. One specific advantage is that the individual publisher/service provider is in control of the customer billing relationship. The system thus presupposes multiple billing agents and requires no centralized database of user-specific demographic data.

4.3.4. Low Impact on Personal Privacy Issues

In the TVS model, independent content providers manage their own users, and cooperate to "pool" this user base. In addition to the technical reasons for this design decision, this allows the content providers to maintain the customer relationship, which in turn means that publishers are able to provide a richer (and even personalized) experience to their users. Further, locality of the user base offers a better chance that users' desire for privacy will be respected.

In providing the TVS service, Clickshare Corporation or its licensee maintains only transitory knowledge of any specific user, and even then, only by a user identification number (not by demographic or financial information).

4.3.5. Supports a Number of User Billing Models

Clickshare believes that no single model of charging users will be completely effective in the diverse Internet environment. Further, it is not clear what all the options are, or how they might be administered in such a distributed environment. Consequently, TVS does not enforce a specific billing model, but rather enables a wide variety of models, including so-called "micro-transaction" or per-page billing.

4.3.6. Support Both Fixed and Flexible Profile Information and Service Classes Clickshare Corporation feels that as commercial use of the Internet increases, both users and providers will want different classes of service that can be offered to fit specific price requirements or usage demands. It is possible to develop very low-level class-of- and quality-of-service levels (and indeed this is being developed now by the Internet Engineering Task Force (IETF), and also possible to design solutions to fit each specific application or each provider. TVS offers service and user class "infrastructure" as part of the TVS service, which itself is independent of application (though it is currently offered only through the World Wide Web "application") and provider. Because such classing is not yet well-defined in either engineering or marketing domains, Clickshare intends to work with its early partners on such development. The TVS service classing features are easily extended to provide a flexible growth path and accommodate change.

With this classing infrastructure in place, TVS also offers user profiling and preference specification capabilities, again with the same extension capabilities. These capabilities support many of the advantages that are to be gained from developing application-specific profiling, without the inherent incompatibilities of application specific design. application-specific profiling, without the inherent incompatibilities of application specific design.

4.4. No Specific Privacy Model Enforced

Clickshare realizes that being involved in the "authentication" universe means dealing with sensitive personal financial information. There is a lively debate on-going among privacy advocates and content providers (who use the sales of lists of such information to enhance their revenues).

The TVS model does not enforce a specific privacy model. The service itself operates by identifier numbers, not by names, and Clickshare Service Corp.—on its own—will not be able to correlate an ID with a person. However, nothing inherent in the TVS service specifically prevents a Publishing Member from making this correlation on his own through methods unrelated to the Clickshare service. It is possible within the design of TVS to offer a "Swiss-bank" type of "blind usage" for users that wish to pay for same. No such service is currently implemented.

As designed, TVS will be able to collect and aggregate content usage information and "localize" this information to a specific user-ID and provider-ID. This alone will go a long way towards providing third party verification of use without direct reference to personal information.

4.5. Charging Per-Request a Feature not a Requirement

TVS is designed to handle charge-per-page billing in a cross-server settlement type model. However, the market may demand that such a service is not required (that is, not profitable). Therefore, TVS can operate as an authentication/verification engine without settlement. The presence of a 3rd party verifier has significant value even in this arena.

Further, in the charge-per-page model, TVS does not "force" publishers to bill the users themselves for each click. TVS merely enables each publisher to develop his own billing technique, with the service financed with any combination of ad subsidy, subscription and a la carte pricing.

4.6. Design Foresees Need for "Trusted Third Party"

Looking at the process diagrams shown in FIGS. 1 and 2, it is easy to imagine "cutting TVS out" and having HTTP servers talk among themselves. In a technical sense, with the protocol code in hand (and using almost the same API) this is possible. However, this then forces each individual HTTP server to both serve content requests, and serve all authentication requests whenever a user "roams" to any other service. This is distributed service, but possibly to the detriment of performance of every single server host. In the TVS model, as in so many other Internet client/server models, the individual server is relieved of the burden of performing the redundant function.

From a non-technical perspective, there is a benefit in allowing a trusted third-party to serve authentication and access logging functions. Having a trusted third party involved is a method of "neutral" verification of use, something already desired by advertisers (and already common on other communication/advertising media). In addition, all service providers know and trust the provider of the Clickshare/TVS authentication service, while not all service providers know or trust all other service providers from whom, in the absence of the trusted third party, they would have to rely for user authentication and perhaps billing information as well.

5. TVS

5.1. The Model

Clickshare Service Corp. feels that a distributed approach should be taken when developing a high volume service for the Internet. Indeed this is common practice and several existing scalable services, notably BIND-type domain name service, use this technique. The TVS model distributes a very large user base among the independent content providers, but offers a single service-point from which each provider can get information about any active user. The implementation of TVS parallels the BIND model wherein any individual host needs to contact only one "name server" for information, while the name servers themselves "cooperate" to manage user information (in a manner that is not of concern to the individual host). The TVS service is scalable from a single server host to a multi-host environment transparently to its clients.

Using the TVS model, individual publishers or service providers authenticate their own users, and then ask TVS to store the user's preference, pricing and service-class information in a "publicly accessible" place. In return, TVS provides an authentication token which is returned to the user (specifically, the user's browser). All subsequent access to any TVS-enabled service is governed by this token (non-TVS services are not affected). TVS validates the token on behalf of any individual service, and passes in return the user's profile and class information. When a server has provided service to a validated user, that server returns to TVS a record of the service provided. This record is used by TVS to generate a number of forms of usage information, particularly billing and settlement information. Periodically, this information is returned to all publishers.

5.2. Terminology

A small number of terms are added to the lexicon by TVS.

5.2.1. Identifiers

To differentiate individual customers (called "User Members"), each is assigned an ID number, and similarly each content provider (called a "Publishing Member") is assigned a unique ID. Though an individual customer may have several accounts, each has a separate User Member ID (UID). Each of these Ids is assigned to a specific Publishing Member ID (PMID). This association is referred to as the user's "home". The TVS concept that each user has a "home" is important as it localizes the service to an individual Publishing Member and allows for graceful support of a number of error conditions that might occur with such a widely distributed user base.

5.2.2. Session

TVS introduces the notion of a "session" into the World Wide Web. Once a user is authenticated by his "home" Publishing Member, that Publishing Member provides user profile information to its TVS server, which returns an authentication token that is valid for a restricted period of time. Once given this token, the user can access any TVS-enabled HTTP server for the duration of validity without reauthentication. This time period is the "session". The user may directly end his session prior to the pre-determined time-out, but is not required to do so. Further, upon time-out-out, Clickshare can return the user to his "home" Publishing Member for re-authentication transparently. Thus, sessions can be concatenated as well.

5.2.3. User Profile

Publishing Members maintain a "user profile" of each User Member. This profile contains three types of information: "preference" information, "service class" information and, if desired, "pricing" information. Preference information is given by the user member, while service-class information and pricing information are provided by the Publishing Member. These types of information relate to the variety and quality of services offered by the Publishing Member, and each may affect the cost of that service. Some of the profile information can be changed on a session basis, where other types can only be changed by the Publishing Member at fixed points.

At the start of each session, this profile information is passed to the TVS server when the HTTP server requests an authentication token for the user. The information is loaded by the TVS server into a Dynamic Session Database. When, during the session, any Publishing Member requests that TVS validate this authentication, TVS returns the profile information to that Publisher as part of the authentication. Thus, even though each user is "owned" by only one Publishing Member (the "home"), all Publishing Members have access to that user's profile information through TVS.

When a user's session expires, TVS drops that user's profile from the dynamic session database (though portions of it are logged in a service record). Thus, TVS has no permanent record of any individual user. The profile information passed to Clickshare by the Publishing Member's HTTP server does not include personal information that would allow a user to be identified by name or financial association. Clickshare indexes profile information by UID+PMID only.

5.2.4. Authentication Token

When a user begins a session, his Publishing Member returns to him an authentication token (which he has received from TVS). The token contains information that identifies which TVS server originated the token, as well as information that identifies the associated user. The user (actually, his client browser) uses this token for all subsequent access to TVS-enabled publishers.

5.3. Service Components

The Clickshare Service has been designed as a distributed set of cooperating components that together provide an integrated user management environment. The initial focus of this environment is to provide micro-transaction settlement and audience measurement services to independent publishers and billing entities of all sizes and service volumes. However, the environment can also be used to control access to services or intangible goods based upon attributes of the requesting user as revealed to the proposed service provider via the authentication token. These services need not have any monetary value. Some of these components run on computers operated by Clickshare Service Providers (at sites not affiliated with Clickshare Corporation). These are called the client side components. The rest, currently, run at Clickshare Corporation's own site. These are the server site components.

5.3.1. Server Side Components

Clickshare Authentication Service

This service authenticates users in real time allowing each user access to any Clickshare Service Provider without reauthentication for the duration of one session. This service is provided by a set of server machines distributed around the Internet for better fault tolerance and performance.

Components
+ Token Validation Service (TVS) server/daemon (tvsd)

Clickshare Logging Service

This service logs user transactions occurring at all Clickshare Service Providers sites, in real time. The major component of this service is the Logging Facility—a large database storing all transaction records for production billing. This facility can be operated behind a firewall, due to the design of the Facility interface server.

Components
+ Clickshare Logging Facility (SQL database) (mSQL)
+ facility server interface daemon (logd)

Clickshare Settlement Service

The service "settles" accounts receivable/accounts payable activity among the Clickshare Service Providers on a periodic basis. It interfaces to the Logging Facility database environment in an "off-line" (non real-time) manner. Activity reports are generated for all parties. An interface to the Automated Clearinghouse (ACH) allows fully automated settlement.

Components
+ settlement engine
+ interface to automated clearinghouse (ACH, Bank of Boston)

Clickshare Billing Interface

This service provides periodic billing records and account summaries to each of the Clickshare Service Providers. It interfaces to the Logging Facility database environment through a set of billing procedures which themselves are tailored to interface with customer billing systems. Billing records are sent to the Service Providers via electronic mail. As an auxiliary capability, the Clickshare Billing Interface can generate user account update summaries upon request from the Service Providers.

Components
+ billing record generator
+ billing report generator
+ session summary generator/remailer
+ interface to Visa/MC electronic merchant vendor service Clickshare Interchange Service This service maintains a master database of Clickshare Service Provider and clickshare Publishing member IDs and periodically updates the slave databases on CSPs and CPMs' web servers. Authentication and logging functions cannot be used by client servers unless the client server presents an ID which is contained in the master database.

5.3.2. Client Side Components

Clickshare Web Server

This service replaces the traditional HTTP (web) server on sites that participate in the Clickshare Service. It processes user requests for information/entertainment resources stored on the site. It interfaces to the Clickshare Authentication Service and the Clickshare Logging Service to manage, measure and account for access to these resources. Each Service Provider operates one of these servers.

Components
+ Web Server deamon (httpd)
    NCSA HTTPD-based Web Server
    Apache-based Web Server
+ client interface to Clickshare Logging Facility (cs_logd)

Clickshare User Registration Environment

This service allows Service Providers to register users for the purposes of access control, service customization and billing. All user demographic and financial information (in addition to preference and service classing information) is stored in these databases at each Service Provider site. Users are authenticated locally from information stored in these databases, after which a subset of the stored information is provided to the Clickshare Authentication Service so that it can help all Service Providers recognize valid Clickshare users.

Components
+ user registration facility (misc)
    interface modules for Clickshare Web Server
    stand-along administration/maintenance programs
    HTML pages and forms for user interface 5.4. TVS "C" Language Application Programming Interface This section describes the TVS applications programming interface (API). This interface is written in the C programming language for wide applicability to most Web servers written in C, C++, or Objective C. Using this interface, programmers do not have to interact with the TVS wire protocol, or with the details of the internal data structures. Since Clickshare is still in its early development, this interface insulates programmers from the many changes that will occur in the low-level design. The TVS API was developed and written for the Unix™ operating system. The API uses widely-available and well-documented Unix™ features and functionality, such as Berkeley-type sockets. Clickshare intends that TVS be made available first in the Unix™ environment, but does not preclude porting the client API to other operating environments (notably, Microsoft Windows NT).

A better mode for implementation of the TVS model might be through the use of the Java programming language, or another language, to construct an applications mini-server which acts as a client to the TVS authentication and logging service. When an HTTP request is received by the Clickshare host seeking to vend a service or good, the miniserver would look for a TVS token and, if present, verify it and strip off the URL. Then the miniserver would connect to the waiting, unmodified, HTTP server deamon at the host site. When the reply is served by the HTTP server, the miniserver would annotate the outgoing HTML code with the TVS token. The system administrator would configure the underlying HTTP server not to accept requests other than from the applications mini-server. The advantage to this approach would be its ability to work with any HTTP server without modification or significant reconfiguration.

5.5. Service Interface
5.5.1 Data Structures

The TVS Applications Program Interface (API) defines three data structures used as objects to the TVS library of function calls. Two of these can be accessed directly, but the third, the TVS_TOKEN, is opaque. All three are treated as opaque since library function calls (described below) are provided to access the information inside where appropriate. The appellation "tvs" in all the names comes from the pre-Marketing name for the Clickshare Service—"Token Validation Service".

The following definitions are from the header file "tvs_client.h":

typedef char *TVS_TOKEN;
typedef char *TVS_PROFILE;
typedef char *TVS_SERVER;

5.5.2. Function Calls

Seven functions make up the interface to the TVS service.
These functions are also defined in the header file "tvs_client.h".

When the TVS client wishes to gracefully end a session with its server, this function is called. Afterward, no requests will be served until another tvs_initialize_service( ) request is received.

```
extern void tvs_drop_service(TVS_SERVER ts);
/* if the TVS client exists badly from a session (machine crash or
emergency signal), this function is called to assure that the client starts a
clean session with a TVS server.
NOTE: the function tvs_initialize_service( ) calls this function prior to
initializing any new session. It is "safe" to call this function even in the
case that the client is certain there is no established session.
*/
extern void tvs_invalidate_service(TVS_SERVER ts);
```

The following functions handle administrative and memory management aspects of using the TVS service.

```
/* when Authentication Tokens are returned, they are allocated from
dynamic memory. This function frees a dynamically-allocated token
after it has been used.
*/
extern void tvs_destroy_token(TVS_TOKEN token);
/* when TVS server errors occur, TVS tries to return
* usable error information. Also, the API library manages local
information used in error reporting. These functions are used to
access that error information.
*/
extern void tvs_perror(char *string);
extern char* tvs_strerror( );
/* this definition and function allow the client to determine the status
of a token.
*/
enum t_error_type {
    TOKEN_IS_OK = 0,
    TOKEN_IS_GARBAGE = 1,
    TOKEN_IS_INVALID = 2,
    TOKEN_TIMED_OUT = 3,
    USER_AT_INVALID_HOST = 4,
    NO_TOKEN = 5
};
extern int    tvs_token_is_error(int terr_type);
/*
* if a token is not OK, it might be necessary to get the location of the
user's home publisher. This is returned by TVS and available
through this function.
/*
extern char * tvs_get_user_home( );
```

5.6. Profile Functions

When TVS receives a request to validate a valid token, it returns the profile of the user identified by that token. Though

```
/* tvs_initialize_service( ) is used to begin a session with TVS. This function returns a
TVS_SERVER data structure that will be used in all subsequent service requests.
*/
extern TVS_SERVER tvs_initialize service( );
/* These three requests are the bulk of the TVS service. They are called to obtain, validate, and
invalidate user authentication tokens.
*/
extern TVS_TOKEN tvs_new_token(TVS_SERVER ts, TVS_PROFILE prof);
extern TVS_PROFILE tvs_validate_token(TVS_SERVER ts, TVS_TOKEN token, unsigned
long host_id);
extern int tvs_invalidate_token(TVS_SERVER ts, TVS_TOKEN token, int reason);
/* Occasionally, the TVS client may wish to get a human-readable version of the TVS server
identifier for logging.
*/
extern char * tvs_identify_tvs_server(TVS_SERVER ts);
``` the TVS_PROFILE data structure is defined in the API, and data can be accessed directly, the following helper functions are provided. In general, this is the preferred access technique, because it is highly likely that the TVS_PROFILE structure will change.

The log record returned to TVS is, currently, compatible with the public domain server logs commonly used. Several pieces of additional information are added to each record, however, using an extensible key/value technique. This information assists TVS in the settlement process.

```
/* these functions are for creating and "loading" a profile structure */
extern int tvs_sizeof_profile( );
extern TVS_PROFILE tvs_make user_profile( );
extern void tvs_set_userid(TVS_PROFILE prof, unsigned long uid);
extern void tvs_set_pmid(TVS_PROFILE prof, unsigned short pmid);
extern void tvs_set_hostid(TVS_PROFILE prof, unsigned long hostid);
extern void tvs_set_service_class(TVS_PROFILE prof, int class);
extern void tvs_set_hostid(TVS_PROFILE prof, unsigned long hostid);
extern void tvs_set_service_class(TVS_PROFILE prof, int class);
extern void tvs_set_page_class_limit(TVS_PROFILE prof, int limit);
extern void tvs_set_page_count_limit(TVS_PROFILE prof, int class);
extern void tvs_set_service_priority(TVS_PROFILE prof, int priority);
extern void tvs_set_pdac_flag(TVS_PROFILE prof, int flag);
extern void tvs_set_customer_group(TVS_PROFILE prof, int group);
extern void tvs_set_adv_context(TVS_PROFILE prof, int ac);
extern void tvs_set_privacy1_flag(TVS_PROFILE prof, int flag);
/* upon receipt of a TVS_PROFILE--the acknowledgement of a token validation by TVS--
information in the profile can retrieved using the following functions.
*/
/* this is a quick test that the data structure is not garbage */
extern int tvs_profile_is_valid(TVS_PROFILE prof);
extern unsigned long tvs_get_userid(TVS_PROFILE prof);
extern unsigned short tvs_get_pmid(TVS_PROFILE prof);
extern unsigned long tvs_get_hostid(TVS_PROFILE prof);
extern int tvs_get_service_class(TVS_PROFILE prof);
extern int tvs_get_page_class_limit_TVS_PROFILE prof);
extern int tvs_get_page_count_limit(TVS_PROFILE prof);
extern int tvs_get_service_priority(TVS_PROFILE prof);
extern int tvs_get_page_flag(TVS_PROFILE prof);
extern int tvs_get_customer_group(TVS_PROFILE prof);
extern int tvs_get_adv_context(TVS_PROFILE prof);
extern int tvs_get_privacy1_flag(TVS_PROFILE prof);
/* the contents of the profile can be displayed in human-readable form */
extern void tvs_show_user_grofile(TVS_PROFILE prof);
```

5.7. TVS Protocol Implementation

The TVS wire protocol is simple, compact and invisible under the applications programming interface. Nonetheless, several important points should be discussed. Please note that the API library interface allows Clickshare to per-form a full frontal lobotomy on this protocol structure if required without changing the programming interface. Since the TVS service is new, Clickshare Service Corp. expects that the wire protocol (especially) will undergo significant change. Therefore, the wire protocol is not specified here.

5.8. Reliable Datagrams for Verification

TVS is written using the User Datagram Protocol (UDP) on top of the Internet protocol (IP). The inherent "unreliability" of UDP is mitigated by the addition of a "reliability layer" which effects packet timeout and retransmission (from the client side). All protocol operations involve typically 2 UDP/IP datagrams (one in each direction, assuming no retransmissions), and a maximum of 4 datagrams under certain conditions of re-direction within the Clickshare service "back end" (invisible to the client).

The client side of TVS uses the BSD socket connect( ) system call to assure that only packets coming from its TVS server are accepted.

5.9. Reliable Stream for Usage Logging

When an HTTP server begins a service session with a TVS server, it opens and initializes a TCP/IP reliable data stream to a designated logging port on the TVS server. All service requests fulfilled by the HTTP server are logged back to TVS on this connection. The TVS HTTP reference server also performs the normal (local) logging.

UDP has the advantage of being very lightweight. Since virtually all wire transactions contain under 1,000 bytes and are "atomic", the need for a "stateful" protocol like TCP/IP is greatly diminished. In the prototype, a reliability veneer is added over UDP to handle slow or unreliable networks. TCP/IP is used for logging the access records. This method was chosen because consideration is being given to "batching" log delivery (whereby the client saves all log records for "burst" delivery at slow server-utilization periods) and this will benefit from a stateful protocol. The current implementation of the logger is as a separate process (from the HTTP daemon) to facilitate this change if need be.

5.10. Request and Token Delivery

The current interface to the TVS service is through the World Wide Web, specifically servers offering the HyperText Transfer Protocol. Using both Uniform Resource Locators (URLs) and HTTP Request/Response Headers, the HTTP server communicates with client programs ("web browsers"). Separately, the HTTP server communicates with the TVS service using the TVS protocol. Thus, TVS is not dependent upon HTTP for anything beyond delivery/return of the Authentication Token to/from the HTTP server. The TVS service itself (and the delivery interface in TVS "clients") will not be affected if new transfer protocols supersede HTTP.

The prototype implementation of TVS uses the Uniform Resource Locator (URL) to return the Authentication token (until a standard exists for transferring it in a Request/Response header). Therefore, TVS is dependent on the URL format, but not on the HyperText Markup Language (HTML), though HTML is the only widely-accepted text language that uses URLs. Should HTML be superseded by another markup language, TVS delivery is still possible. Experiments early commercial work with Adobe Portable Document Format (PDF) and TeX's "Device Independent" format (DVI) have shown that these formats can accommodate URLs, and can be considered for hypertext applications.

5.11. TVS Server Architecture

The TVS Service is actually a set of services available to clients through an object-oriented modular architecture. The details of how these services are provided are "hidden" within this object structure and applications programming interface.

Currently, the Clickshare "session management" (user authentication and validation) services comprise one service, the access logging another, and the settlement service yet another. Session management and access logging services are "real-time", designed to handle and scale to a very large load with minimum impact on service latency. Settlement is an off-line non-real time process which does not effect the provision of the real-time services.

5.12. The Token Validation Service (TVS)

The Token Validation Service (TVS) handles user session management. After a TVS-enabled HTTP server authenticates a new user, it passes that user's profile information to Clickshare along with a request for a new authentication token. Thereafter, for the duration of that user's session, the Clickshare TVS server "validates" the user whenever the user presents a URL request to any TVS-enabled HTTP server.

The TVS server maintains a Dynamic Session Database (short-lived) of active sessions, indexed by user identification number, "home" publisher affiliation, and the user's host IP address. Among the data contained in the Dynamic Session Database are:

Alpha-numeric identifying number of the user
User-owning publishing-member number (Clickshare Service Provider)
Session number Current number of authentications (cumulative)

User service parameters including:

Parental control flag (ON/OFF)
    Full ads/links only/no ads
    Pricing query threshold
    Service-class designator (price markup value)
    Session start time
    Topical information preferences (if "open")
    Age, sex, income, demographic profile (if "open")

Upon completion of a session, this information is logged to provide a record of the session which will be used to accompany billing and settlement information. No permanent knowledge of a user, or a specific session, is retained by this server.

The TVS server databases are very straight-forward, but very fast, hash/value tables which use GDBM from the Free Software Foundation. This technology scales to more than one million entries (one million active sessions), and offers features for restart and fast-startup. Virtually no "database management" functionality is required in this application since no permanent knowledge is stored here.

Since the TVS service is provided on machines separate from the HTTP servers, there is a possibility that either machine failure or network outage may make the service unavailable temporarily. In such cases, the HTTP server will issue itself a "restart" which will attempt to reconnect the server to another TVS server on another part of the network. Users with active sessions will have to re-authenticate with their home publisher, but this is transparent given graceful handling by the TVS client web server and caching of username/password in most browsers.

5.12.1. TVS Process Model

The use of UDP/IP as the underlying wire protocol and fast hash/value tables for the authentication/validation portion of the TVS service allows the use of a single process for the TVS server, except under specific circumstances (see below). However, the TVS server software design allows for future migration to a "master and pre-allocated slave" model if the load outstrips the single process model.

5.12.2. TVS Scalable Multi-Server Environment

The HTTP server's actions of initiating a session with TVS and asking TVS to generate a new Authentication Token require communication with only one TVS server. However, a single TVS server cannot permanently serve more than a small number of clients. Therefore, the service needs to scale (in terms of addition of servers) to provide service "bandwidth". Once such an multi-server environment is introduced, there will be inter-server communication—in addition to client/server communication—for the actions of validating and invalidating authentication tokens. The TVS wire protocol and server software are designed for this multi-server environment.

It is anticipated that the Clickshare Service will include a Clickshare Interchange Service [See FIG. 2, Service Model for Multiple Authentication/Logging Licensees], which will maintain a master database of IDs for Clickshare Publishing Members and Clickshare Service Providers and this master database will be periodically distributed in a secure manner to slave databases maintained by multiple Clickshare Authentication and Logging Servers (CALS). These CALS may be independently licensed and owned but will, using the TVS protocol, have the technical capability to authenticate each others end users and relay real-time log reports for settlement. In effect, each CALS functions not only as a server to CSP and CPM clients, but also as a server to its peer CALS. Thus it is relatively transparent to each CALS whether it receive a token validation request or a log report from a CSP, a CPM or another CALS.

The TVS client-side (HTTP server) architecture is designed so that on start-up (or soft restart) the HTTP server searches for it's service-provider from a local list of options. If, due to network or service host failure, the Clickshare authentication or logging facilities become unavailable, the HTTP server will restart and search for a new (available) service host. Since authentication tokens handed out by the now-dead TVS service are invalid, users will be returned to their home publishers to re-authenticate. This condition is handled gracefully through HTTP redirects, such that the user may not even see this condition (depends on the user's browser type). Independent of the number of TVS servers, and independent of the number of HTTP servers being served, at most two TVS servers will be involved in validating or invalidating a specific authentication token. Thus, there will be at most four (4) packet transmissions required for the most-commonly occurring activity (validation), assuming no retransmissions.

5.13. The TVS Logging Facility

All information transactions that occur on all TVS-enabled HTTP servers are logged to the Clickshare Logging Facility. This service resides on the same computers as the authentication service such that each HTTP server selects one computer to provide both services upon startup.

The logging service is provided on the client (HTTP) side by a separate process accessible through a Unix-domain UDP socket. This process maintains a reliable TCP/IP connection to the TVS Logging Facility. The HTTP server accesses the logging process as part of the normal (local) logging activity done by the server. Clickshare-specific information is added only to the log information intended for the Clickshare logging facility (not the local log).

On the server (logging facility) side, a master logging process spawns a slave process for each connected client. Each of these slave processes opens a connection to the Facility's log database manager. This database manager can reside on the log server machine or on another machine (accessed through a network socket). The Facility's databases are organized such that as transaction records are returned they are "filtered" by "owning publisher". Thus all records for one user reside in one database—that of his "home" publisher. These log databases are updated in real-time. The Facility's database manager can "dump" these databases into the offline settlement service at any appropriate frequency (daily, weekly, monthly) depending on load.

The logging processes use SQL to "talk to" the Facility's database manager. Currently, the logging processes are C language programs which use our own API to insulate the programs from the specifics of our vendor's interface to its SQL database manager.

The service envisions that some end users will wish to query, through an HTML-forms interface or otherwise, the filtered server log database, to determine charges which have been applied to the user's Clickshare ID number since the last settlement to a billing/credit facility. This application will require a separate real-time application which is aware of the pricing rules being applied by the end user's Clickshare Service Provider—and to which the end-user has "subscribed"—providing the application with the end user's globally unique Clickshare ID number. When queried, the application can parse from the owning service provider's server active log database all records associated with access by the querying user's Clickshare ID number and present them in an HTML form for review. The purpose of this application is to permit users to gauge their rate or resource usage, or permit Clickshare Service Providers to apply session-based charges against billing or credit facilities—including smart cards—during periods between system settlement.

5.13.1. Clickshare-Enhanced Log Format

The TVS client transmits to the server (logging facility) side records of each access in an enhanced Common Log Format. Seven pieces of information are provided in the Common Log Format:

---
fully qualified domain name (or dotted decimal IP address) of the client
rfc931 user
auth user
date in dd/mm/yyyy:hr:mn:se -0XXX format (where 0XXX" is hours from GMT)
the request (a quoted string featuring method + URL filepart)
the HTTPD status code
the number of bytes transmitted to the client
---

In addition, the TVS client transmits the following Clickshare-specific information:

content server ID (cs_contentpmid)—A globally unique ID number identifying the company which served the content to the user. Clickshare Service Corp. maintains a map of ID numbers to company names and contact addresses.

page class (cs_pageclass)—A numeric identifier for the value of the page served. The value is used as a lookup into a table of currency-denominated values which are used to price the page.

user ID (cs_userid)—A user identifier, unique to each Clickshare service or content provider, that identifies the user within that provider's site.

home publisher ID (cs_homepmid)—A globally unique ID number identifying the company which maintains the financial relationship with the user (user ID) for billing purposes.

session ID (cs_sessionID)—An identifier for an activity session by a user. A session is a defined period of time during which an authentication token is valid. The length of a session can be requested by the user, or set by the home provider, upon startup). Sessions may be concatenated in time, but sessions cannot overlap. Session IDs are unique to each publisher for a period of about eight months.

customer group (cs_custgroup)—A numeric identifier for the customer's local group. Two groups are global within Clickshare: Group 1, the default standard group and Group 15, the "testdrive" group. All other values are set locally by the home publisher for his own reference.

service class (cs_serviceclass)—A coded numeric identified for special service classing. Service classes may be related to markup ratios for retail pricing or may specific the types of services or goods which the user is authorized to acquire or receive.

flags (cs_flags)—A coded numeric identifier which concatenates all the user-preference flag information (on/off flags) for this session. These preference flags relate to user privacy, parental-control (content selection) and other features and part of the "contract" between the user and the user's Clickshare Service Provider.

Other open data blocks are designed to carry releasable demographics and topical preferences, or other metrics, depending upon the requirements of Clickshare service members.

5.14. User Registration Environment

The prototype implementation of the Clickshare/TVS service provides a User Registration Environment as a distinct application which is compatible with the TVS client web server. Upon a user's first attempt to access resources within the TVS environment the user is redirected to the User Registration Service. The user is requested to enter their name, choose a password, and provide certain demographic and account information, including credit-card data. In some versions of the User Registration Service, the user is also requested to enter preference information about Service Class, Query Threshold, Privacy and Parental Control and Content Preferences. The prototype implementation does not provide for real-time verification of credit card information, but this should be provided in commercial implementations.

5.15. Settlement of Usage Data

The prototype implementation of the Clickshare/TVS service provides a Settlement Service as a distinct database-management application which operations in conjunction with the TVS logging engine. This Settlement Service shorts records of user access to resources by Service Provider and by user within Service Provider and prepares the records for batch deliveries to the individual user's Service Provider. The Settlement Service also outputs charge records aggregated by Service Provider in a format which can be accepted by gateways to the U.S. banking industry's Automated Clearing House (ACH) service for electronic debiting and crediting of Service Provider and Publishing Member banking accounts.

Finally, the Settlement Service outputs charge records aggregated by end user within Service Provider to a Billing Service in a format specific to the most common PC-based program for application of charges to credit-card gateways. Finally, Clickshare contemplates an interface for outputting individual, aggregated user charges in a format which can be employed by resellers of telephone company billing services to apply transactional charges to telephone bills.

5.16. Differential Charging Per Record ("Markup Ratio")

A unique feature of the TVS protocol is the provision for a field which permits differential charging for information sale between an information owner/publisher and various Service Providers ("user owners"). Each logged charge record includes a data field carrying the "[Page] Value Class" of the content or service vended by the vending provider site (publisher). The Value Class is a numeric value assigned by the vending provider from a common table of values known and agreed on a system-wide basis. This Value represents the "wholesale royalty" which the vending site will receive at settlement from Clickshare/TVS, less a transaction fee withheld and charged by Clickshare/TVS.

However, the Service Provider who maintains account records of the end user and is responsible for billing the end user, may wish to apply a retail markup to the Value Class expected by the vending publisher. In the TVS Service, this retail markup is know as the "markup ratio." The "markup ratio" is derived from the Service Class identifier, and is among the user preference attributes contained in the token which moves about the service following initial authentication of the user for a TVS session. The operator of the TVS authentication and logging service does not use this field in any way. However, the vending publisher may need to know the Markup Ratio being applied by the Service Provider in order to "show" the price of a service or resource to the end-user prior to or during the sale process.

The markup ratio allows the vending publisher to provide an instantaneous "price tag", including any retail markup, to the requesting user, prior to sale. Because the markup ratio is set by the Service Provider, two users from two different Service Providers may pay a different retail price for the same resource provided at the same time by a vending publisher. In effect, the same good may show different "price tags" simultaneously to different users. This feature is analogous to the operation of the wholesale-retail marketplace in the physical world, where consumers may find widely varying retail prices for the same physical product at different stores as a result of different marketing and cost structures of each retailer. For example, one appliance store might sell the Brand A toaster for $29.95. A competing appliance store might sell the identical Brand A toaster for $25.95. Both purchased the toaster from a wholesaler for $14.95. Under the Clickshare Service, the wholesaler must be able to "show" both prices depending which "store" the consumer is inquiring from.

5.17. Private-Key Encryption Used

In the current implementation of the TVS service, almost no encryption is used. The only transacted item that is encrypted is the authentication token which travels along with each user request. This token is issued by the Clickshare/TVS authentication server, and only that server needs to "decrypt" it. All other parties (HTTP servers, and other TVS servers) treat the token as "opaque". Since only the originating TVS server will view the contents of the authentication token, a "private key" encryption algorithm can be used. That private key is stored on the authentication server which originates the token, and remains valid only for the duration of that user's session.

Currently, TVS uses the IDEA encryption algorithm with a 128-bit key. Since the encrypted data is only valid for the length of one session, and further since the encrypted data has no "enduring value" that warrants use after the session (e.g., credit card number or index), a 128-bit key is sufficient to protect this data for the duration of the session.

In the future, experience may require that the communication channel between the HTTP server and the Clickshare authentication and logging facilities be encrypted. Since the nature and format of these communication channels is "hidden" in the C programming language API, addition of encryption is totally transparent to both the authentication and logging processes (there are likely to be externally visible additions to configuration files, however).

5.18. Other Modes for Transferring Token

To transfer tokens, we selected the query-string presentation technique because it is completely browser-neutral (a trait which appears necessary to get TVS widely used initially). However, this technique makes it difficult for the HTTP server to calculate the Content-Length in advance, and makes it easy for any user to cut-and-paste a valid token to an invalid request. Further, the "one Token per session" notion is subject to wire snooping, where a snooper can grab the Token, and use it in combination with a falsified IP address to gain unauthorized access.

A better technique is to put the token in an Authentication request/response header. This technique is suggested in the recent IETF "Digest Authentication" draft, and a demonstration of this will be present in the early TVS service. If web browsers and other web clients widely adopt this technique (we think this is reasonably likely), this will limit certain forms of token theft.

An even better technique, which would require special additional software on all web clients, is the combination of the Digest Authentication technique with a one-time password technique (as described in another IETF proposal from Bellcore). Using this technique, the TVS service could authorize a limited number of access attempts (say, 150) after which time the session is invalid. At each use, the client sends a one-time password, the "base" for which is pre-agreed (such that the server is able to correctly identify the "next" in a series). This has the additional advantage that authentication can be somewhat de-coupled from IP address (as is the case in the current TVS model).

Recently, the IETF's HTTP Working Group offered an Internet Draft entitled "A Proposed Extension to HTTP: Digest Access Authentication" for discussion by the standards community. Though intended for a single-publisher relationship, this authentication method can be used by TVS-enabled HTTP servers as well, without modification (that is, "as proposed"). A prototype implementation of this technique will be in the reference implementation, though the proposal is likely to undergo a number of modifications before its acceptance.

5.19. Status of Public-Key Encryption

Both of the above alternatives can make use of private key encryption—which is (largely) unencumbered by legal concerns.

There is tremendous turmoil surrounding security these days, particularly as relates to passing credit information over the wire. Further, there is much debate over the legality and exportability of virtually all "public key" encryption techniques. Until there is clarity on these issues—clarity that will allow developers to use security techniques without fear of arrest or hefty legal defense expenses—Clickshare Service Corp. feels it is not beneficial to become involved in this arena for the area of commerce TVS intends to pursue. In the TVS model, no credit card information passes over the wire. Thus, the only gain in obtaining a token is access to low-value content for a limited period of time. This is quite different from theft of credit card information which can result in thefts of very significant dollar value over an unlimited period of time. Therefore, a number of current, unencumbered, techniques can be employed.

Clickshare Service Corp. does not discount the value of security or any of the high-security protocols extant or imagined. However, there needs to be match of security to exposure. This match is largely missing from the current debate. We believe that the TVS model can and will benefit from new work, and will be able to adapt missing from the current debate. We believe that the TVS model can and will benefit from new work, and will be able to adapt to these new tools.

5.20. Use of Extensible Markup Language to Address Network Caching of Content (Please Refer to FIG. 2 for Terminology Lexicon)

The core architecture of TVS assumes that the "owner" of resources served to end-users corresponds to the Publishing Member or Service Provider on whose server the resource resides. By making this assumption, it is possible to automatically allocate royalty payments for chargeable resources according to the PmbMbr/SrvcProviderID of the vending content server with reference to the contents of the resource itself.

However, a variety of schemes are being proposed for replicating or caching original content on multiple physical servers. These proposals are intended to reduce bandwidth bottlenecks on the Internet by dispersing popular content to many locations. This raises the possibility that a resource "owned" by CPMa, for example, might come to reside on the physical network server of CPMb. In such a case, it is CPMa who is entitled to a royalty payment when the resource is physically served by CPMb.

At the same time, the near-standardization of Extensible Markup Language (XML) presents an opportunity to create the notion of a Universal Document Identifier (UDI) which would be embedded in XML-marked-up documents or resources. This UDI could include six numeric components which, taken together, constitute a globally unique resource identifier.

5.20.1. The creation date/time in YYYYMMDDHHMMSS format.

5.20.2. The PubMbrID of the resource owner entitled to receive royalty payments, until the expiration date (see 5.20.4 below).

5.20.3. A Digital Object Identifier (DOI) in the syntax and form as proposed by the International DOI Foundation [see http://www.doi.org/] or, if DOI fails to become a publisher standard, in the format of a Uniform Resource Name (URN) as proposed by the Internet Engineering Task Force.

5.20.4. A expiration-date in YYYYMMDD format after which the document is prohibited from being served directly. Instead, the CPM server must redirect the requesting CM user to the address derived from the Digital Object Identifier.

5.20.5. A royalty payment which becomes due to the resource/document originator whenever a copy is served. This field would include both a designation of the currency and the payment value.

5.21. The initial version of TVS contains no facility for examining the contents of documents for data fields of interest. Subsequent versions should include the ability for the vending CPMx's server to review a resource prior to serving to determine if an XML-coded Universal Document Identifier is present. If present, the vending CPM should be required to use the PubMbrID and price information from the XML markup in place of default values when submitted a log report of the document purchase to its CSPx.

5.22. Proposed Implementation of "Dead Man's Switch" in TVS Protocol

The prototype implementation of TVS is designed to accommodate the failure of a CALS to respond to an authentication request from a CPM, either because of a network interruption or because the CALS itself is "down" (not operating). In such a circumstance, it is desirable for the CPM to be able to continue to reply affirmatively to HTTP requests for resources from end-user CMs. Later versions of TVS will permit the CPM go ahead and serve resources, storing the log reports in a temporary, local database. On a periodic basis, the CALS will poll all affiliated CPMs and "pull" these log reports for subsequent aggregation and settlement. The business rules of the TVS operating entities will determine who bears financial responsibility for information resources served during the period when real-time authentication of user tokens is unavailable.

5.23. Credit Management Service Option

Versions of TVS will include a Credit Management Service (CMS) feature which accommodates the need for the establishment of a financial "credit limit" set by the CSP of the CM end user. This will be accomplished through the addition of a field to the user-profile data (or the extended use of pricing query threshold field) which is stored in the CSP's dynamic session database when the CM user initiates a session [See 5.13.1, above]. The operation of the CMS is as follows:

5.23.1. CM user initiates a session request and user's CSP provide CALS with data for dynamic session database. Included in data is a value, Credit(x), established by the CSP in a reference currency supported by the relevant CALS. This figure might be (a) a percentage of the stored value in the CM user's "smart card", or (b) in an account linked to the user's "debit card" or (c) an amount established by whatever entity is working with the CSP to extend financial credit to the CM user.

5.23.2. Each time the CALS receives an authentication request from a CPM who wishes to vend information to the CM user, CALS responds with the user profile data from its dynamic session database, including the Credit(x) value.

5.23.3. The vending CPM's server views the Credit(x) value and computationally compares it against the value of the resource to be vended, incorporating any markup ratio inherent in the cs_serviceclass field value also received from the CAPS dynamic session database. The CPM server knows the cs_pageclass of the resource to be served either by reference to its physical directory location or by reference to a Universal Document Identifier field embedded within the resource. If Credit(x) is less than the monetary value of cs_pageclass times the markup ratio, CPM's server refuses to serve the resource. If Credit(x) is greater, and other service rules are met, the CPM server returns the resource to CM user.

5.23.4. The Clickshare/TVS-enhanced log report returned by the CPM to the authenticating CALS includes the cs_pageclass data field, as well as the cs_userid and cs_homepmid. CALS next performs a lookup in its dynamic session database to find the profile information on the relevant cs_userid (CM user). CAPS then replaces the Credit(x) value in the dynamic session database with a new value which equals: Credit(x) minus (cs_pageclass times markup ratio [derived from cs_serviceclass]) Now the next CPM which requests user authentication will receive a new Credit(x) value decremented by the cost of the first resource.

6. Service Model for Multiple Authentication and Logging

The TVS service model envisions the operation of multiple Authentication and Logging Services (CALS) under common or independent ownership or control. Each such entity may provide authentication and logging services to a number of TVS Service Providers (ISPs, banks, telcos, etc.) and TVS Publishing Members (content owners) limited only by the salability limits of the hardware applied to the task. Each independent Authentication and Logging Service issues to its client partners a globally unique Publishing Member/Service provide ID in a format proscribed by the TVS protocol described herein. And each such service reports the issuance of these IDs to the root Clickshare Interchange Service (CIS). The CIS:

a. Assigns a globally unique CALS ID number to each independent CALS,
b. Authenticates, maintains and distributes for replication by CALS a master database of all CALS-issued PubMbr/SrvcProvider IDs,
c. Enforces interoperability among CALS so that a consumer end user of any PubMbr anywhere is technically capable of obtaining, information via HTTP request from any PubMbr globally, regardless of the PubMbr's CALS affiliation,
d. Guarantees payments system wide,
e. Collects interchange fees.

6.1. Cross-System Authentication and Logging—Flow Diagram

The diagram submitted as FIG. 2 provides a graphical depiction of the flow of authentication, content and logging among the various entities comprising TVS. The reader may refer to the diagram, which references the numbered paragraphs below. The Exhibit B legend contains the lexicon of abbreviations used in the numbered paragraphs.

6.1.1. A user member (CM) initiates a session request, typically by submitting a user name/password string via a common World Wide Web browser to the TVS http server daemon operated by the end-user's CSPa.

6.1.2. The TVS-enhanced server daemon executes its own custom process to verify that the CM seeking to begin a session has proper authorization to do so. The procedure may include a process to verify the CM's credit with an external source or database or to check the status of balance of an account against which purchases will be debited. If the CM is found to be properly authorized, CSPa's TVS-enhanced server daemon employs a pre-established UDP connection to its CALSa to (a) Submit user-profile information to CALSa for storage in the CALSa dynamic session database; and (b) Direct CALSa to issue and return via UDP a globally unique session token. This token is also stored in the CALSa dynamic session database and is referenced to the related user-profile information also contained there.

6.1.3. The CALS server returns the globally unique session token via UDP to the requesting CSPa. Its contents are encoded so they may be read only by CALSa and by other CSPs and CPMs within the CALSa service group. CSPa saves the token to assist with later reconciliation and billing of CM information purchases, if any.

6.1.4. CSPa responds to the CM's request to initiate a session by returning a copy of the session token to the CM's Web-browser software. Depending upon the TVS version implemented, the token is returned as (a) a query string appended following the syntax "?TVS=" to all URLs on the HTML page generated and returned to the Web browser; or, (b) as header information; or, (c) or by any other method standardized by TVS protocol adherents and/or licensees.

6.1.5. The CM user next now "clicks" on a URL which addresses a resource at CPMb, a publishing member which is not directly affiliated with the CALS of the CM's service provider. Submitted along with the URL as part of the HTTP request is a copy of the encoded session token.

6.1.6. In considering how to respond to the HTTP request, the TVS-enhanced Web-server daemon at CPMb strips off the session token (which it need not un-encode) and forwards it via a persistent UDP connection to its CALSb for analysis. Prior to returning a result or resource to the requesting CMa user member, it awaits a response.

6.1.7. CALSb attempts to un-encode the UDP-transmitted session token and, doing so successfully, finds, by referring to a database table of global CALS provided and updated by CIS, determines that it was generated by CALSa. Since the CALSb dynamic session database does not contain user-profile information for CMa, CALSb relays the token to CALSa for authentication via a UDP connection which it opens for this purpose. By this process, CALSa becomes financially responsible for the purchases of CMa globally. If CALSb is unable to un-encode the session token, it is discarded and CPMb is told that the user making the information request cannot be authenticated.

6.1.8. CALSa attempts to un-encode the UDP-transmitted session token received from CALSb and, doing so successfully, finds that it was generated by CALSa. Referring to its dynamic session database, CALSa finds the user CM's user profile, including class-of-service and, depending upon the version of TVS deployed, credit/debit-limit and demographic/personalization data. CALSa employs the established UDP connection with CALSb to return the profile information.

6.1.9. CALSb relays the CMa profile information to CPMb. CPMb uses the profile information to make a series of decisions about how to respond the end user's information or access request. Among the decisions points which could lead to refusing the request:

(a) After giving effect to the markup percentage set by CSPa and transmitted as part of the profile information, comparing the ultimate price to the end-using CMa of the resource requested and determining whether the price exceeds CMa's "query threshold."
(b) Comparing the retail value of the information requested against the user's credit limit or debit-account balance, as received from CSPa.
(c) Comparing the type of information requested against the user-defined flag to show or not show "parental-control" material.
(d) Comparing the type of resource requested against the "permissions" granted to the service class of the CM making the request.

6.1.10. Assuming that CPMb finds no basis to invoke any rule against serving the original HTTP request, CPMb returns the requested resource via HTTP, along with a fresh copy of the original session token using the same transfer protocol employed in Step No. 4, above. User has now "bought" information, if it is subject to a monetary charge.

6.1.11. Upon successful completing of the HTTP transmission to the end-user's Web browser, CPMb's TVS-enhanced logging daemon stores a record of the access in common log format enhanced with a number of TVS-specific fields (see Section XX for a description of the additional fields), and also transmit a copy of the access-log report to CALSb. The log report includes the PubMbr/SrvcProviderID of CSPa. Accordingly CALSb relays the log report to CALSa and takes no further action on it. Depending upon the version of TVS, the TVS-enhanced common log format data may include a field containing an XML-compliant Universal Document Identifier (UDI) extracted from the document or resource as well. The UDI should permit determination of the copyright ownership of the original document or resource, regardless of which CPM or CSP vended it. In this manner, TVS partners may "cache" each other's resources to improve network efficiency without affecting the ability of TVS to identify the correct recipient of the wholesale royalty at settlement time.

6.1.12. CALSa receive from CALSb a relayed copy of the access-log report generated by CPMb. Its logging daemon stores a copy in a database of all global access to TVS-enabled resources by users of CSPa for later settlement and billing.

6.1.13. Depending upon the version of TVS, CALSa also copies a log report to a real-time metering and billing utility which will permit: (a) The end-using CMa to request and review records of current session access by clicking to an address on a web server at CSPa. The request generates a call from CSPa to CALSa for current-session access logs for end-user CMa. The logs are then parsed against credit/debit account status, pricing and service-class rules maintained by CSPa for its end-users, and fed into a dynamically-generated page shown to the user; or, (b) The assembly and transmission by CSPa via Email to the end user once in each 24-hour cycle a compilation of all TVS-enabled resource purchases or accesses during the previous period from data provided on a batch basis from CALSa. This permits the end-user to verify and/or dispute charges shortly after they are incurred.

6.1.14. The "show the bill" processes are separate and distinct from the periodic settlement by each CALS of all royalty credits to member CPMs and all royalty-plus-transaction-fee debits to member CSPs. Settlement occurs in the prototype implementation across the bank Automated Clearing House network.

7. Examples of Use

The diagrams in FIGS. 1 and 2 illustrate all the functional components of the TVS service.

7.1. Content Request+User Authentication

To begin, the user points his WWW browser to the home page set up for him at his "home" Publishing Member (step 1). This page has been designated as "authentication required" by the Publishing Member, so the user's browser receives back from the Publishing Member's HTTP server an appropriate status message. The browser prompts the user for his user-name and password, which it then returns to the HTTP server as Request Header information.

TVS does not affect the authentication model used by the HTTP server. Currently, most Web browsers use the Basic Authentication scheme which is not "secure". One additional scheme has been proposed to the IETF (so-called "Digest Access"), and several other schemes—notably, the BellCore "one-time password" scheme—are of interest. The intent of the new models is to provide a very high level of certainty in the authenticity of the user (client). Again, TVS does not dictate a specific model of "original authentication".

7.2. Profile "Registration" and Token Request

Once the HTTP server has obtained the user's Authentication information and has validated it locally, the HTTP server contacts TVS with a request for a new Authentication Token. In making this request, the HTTP server sends the user's profile to TVS with a request for a new Authentication Token. This profile information (along with other per-user information) is stored in each publisher's registration database.

7.3. Token Generation and Return

TVS uses information from the user's profile to build the Authentication token. For example, the user's service class information is used to determine what the token's validity period will be. The Authentication Token has an encrypted "payload" and is "uuencoded" and "sanitized" to accommodate the Web URL naming syntax where required. The token is "opaque" to both the HTTP server and to the Web browser client.

TVS uses private-key encryption technology which is well-known to the Internet community and unencumbered by patent or export restrictions to the best of our knowledge.

7.4. Content and Authentication Return

When the HTTP server receives the returned token, it is ready to deliver the requested content (as well as the token) to the requesting client. The content is delivered in the canonical HTTP method (accompanied by MIME Response Headers as appropriate). The Authentication token can be delivered to the user's client program (Mosaic, Netscape, Lynx, an "agent", etc.) in several ways.

To accommodate current WWW browsers without modification, the Publishing Member's HTTP server "tags" all Clickshare URLs in the requested content with a query string that includes the token. However, this method is not ideal from a security standpoint, and presents difficulties if a rigid Content-Length needs to be enforced. A better model is to use HTTP 1.0 Request/Response Headers to transfer the token among parties "out of view". [See 5.18, above: "Other Modes for Transferring Token."

Upon return of this original request, a TVS "session" has begun.

[Steps 7.1 through 7.4 occur only once per session.]

7.5. Content Request with Token

After receiving his original request (and having been returned a valid Authentication Token), the user will make subsequent requests for information. These requests can go to any number of services including the "home" Publishing Member, any other Publishing Member using TVS, or any other service not affiliated at all with Clickshare Service Corp or TVS. In the (we hope) common case where another TVS-enabled server is contacted, the user's browser will provide the Authentication Token to the server along with the information request.

7.6. User Verification

The HTTP server contacts the TVS server to verify that the provided token is valid (that is, this is a valid user and a valid session).

7.7. Verification and Profile Return

The TVS server receives the request, and verifies it using the internal databases it has constructed from the information provided when Authentication Tokens are issued. As an acknowledgment, TVS returns the user's profile information to the HTTP server.

7.8. Content Return

The HTTP server uses the profile information to determine how best to respond to the user's request. In some cases, information in the profile may indicate that the server should not respond—or warn the user about the cost of nature of the information requested. The profile information returned to the HTTP server can be used by the server itself to fulfill the request (typically the case with standard "static" file service requests), and is also made available as part of the execution environment for Common Gateway Interface (CGI) scripts.

7.9. Content Access Logging

After the HTTP server has returned the requested content to the user, this access is logged to the TVS service. A canonical log format is currently used, with information added in keyword=value form at the end of the record.

Steps 7.5 through 7.9 are repeated for every content/service request within a session when the user requests content from another TVS-enabled publisher. Requests sent to other (non-affiliated) HTTP servers are not affected.

7.10. Handling Validation Time-Out

When a user's Authentication Token "times-out", information requests made with that token are invalid. If the user does not specifically end his session prior to this time-out, it is likely that the user will be making an information request to a Publishing Member other than his "home" when the time-out happens.

TVS, in cooperation with the HTTP servers, provides a mechanism to return the user to his "home" Publishing Member, undertake the process of re-authentication, and return to the site of the timed-out request—all transparently to the user. This process is handled using HTTP "Redirect" responses, but the key to success is the association with TVS which is the only party that knows where the user's home can be found.

A similar process works when completely invalid tokens are presented to TVS for verification. In such cases, TVS instructs the HTTP server to redirect the user to known points (in the current case, to Clickshare Service Corp.'s pages) such that the user can return "home" himself, or can select a "home" if necessary.

It is obvious that minor changes may be made in the form and construction of the invention without departing from the material spirit thereof. It is not, however, desired to confine the invention to the exact form herein shown and described, but it is desired to include all such as properly come within the scope claimed.

What is claimed is:

1. A method, comprising the steps of:
   a) communicating through at least one computer network interface with each of
      (i) a plurality of providers of accountable resources, and
      (ii) a plurality of registrars which register clients, each client having access to accountable resources of the plurality of providers, and each registrar maintaining client-associated accounts for respective clients;
   b) generating tokens comprising encrypted authentication information, by a plurality of different automated computers, each associated with a different registrar, communicated within a digest authentication header through a common computer network, each respective token verifying that a respective client is authenticated by a respective registrar based on at least the encrypted authentication information within the digest authentication header;
   c) logging accountable transactions between a respective client and a provider, each accountable transaction identifying a client-associated account and a transaction economic valuation, in an automated database maintained by the respective registrar; and
   d) periodically accounting for the logged accountable transactions between respective registrars and respective providers.

2. The method according to claim 1, wherein the token further comprises access privilege information relating to an access privilege of the client.

3. The method according to claim 1, wherein the token comprises XML.

4. The method according to claim 1, wherein the token comprises an uniform identifier for the resource provided by the provider, wherein the same resource provided by each of a plurality of resource providers has a common identifier.

5. The method according to claim 1, wherein the token conveys a registrar transaction price markup parameter, wherein an accounted transaction valuation varies in dependence on the conveyed registrar transaction price markup parameter.

6. The method according to claim 1, wherein said generating step comprises conducting a communication using hypertext transfer protocol (HTTP).

7. The method according to claim 1, wherein said generating step comprises an interactive communication comprises a request communicated from the at least one computer network interface and a response to the request received through the at least one computer network interface.

8. The method according to claim 1, further comprising the step of including, within the token, client demographic profile information.

9. The method according to claim 1, wherein the step of periodically accounting comprising netting transactions between a respective registrar and a respective provider.

10. The method according to claim 1, further comprising the step of conducting at least one an electronic payment transaction between a respective registrar and a respective provider, based on the periodic accounting.

11. The method according to claim 1, further comprising the step of conducting an electronic payment transaction between a respective client and a respective registrar in dependence on a client-associated account balance.

12. The method according to claim 1, further comprising the step of imposing a credit limit on the client-associated account.

13. A system, comprising:
   a) at least one network interface, configured to communicate with each of (i) a plurality of providers of accountable resources, and (ii) a plurality of registrars which register clients, each client having access to accountable resources of the plurality of providers, and maintain accounts associated with each respective client registered through the respective registrar; and
   b) at least one processor, configured to:
   i) generate a token comprising encrypted authentication information within a digest authentication header, based on communications with a respective registrar, comprising transaction valuation information, verifying that a client is authenticated by the respective registrar based on at least the encrypted authentication information within the digest authentication header; and
   ii) log accountable transactions identifying a client-associated account and a transaction valuation, maintained by the respective registrar, wherein the logged accountable transactions are adapted to be periodically accounted between the plurality of the respective registrars and the plurality of respective providers.

14. The system according to claim 13, wherein the token further comprises access privilege information relating to an access privilege of the client.

15. The system according to claim 13, wherein the token comprises XML.

16. The system according to claim 13, wherein the token comprises an uniform identifier for the resource provided by the provider, wherein the same resource provided by each of a plurality of providers has a common identifier.

17. The system according to claim 13, wherein the token comprises a registrar transaction price markup parameter, wherein an accounted transaction valuation varies in dependence on the conveyed registrar transaction price markup parameter.

18. The system according to claim 13, wherein the token comprises client demographic profile information.

19. A system, comprising:
   a) at least one accountable resource, selectively made available in dependence on a validated accountable transaction;

b) at least one network interface, configured to communicate with each of (i) a central validation server, (ii) a plurality of clients, and (iii) a plurality of registrars which maintain client-associated accounts for settling of accountable transactions associated with respective clients; and c) at least one processor, configured to:

i) respond to a token comprising encrypted authentication information received from the central validation server defined based on communications with a respective registrar of a client, comprising accountable transaction valuation information and client authentication information within a digest authentication header;

ii) generate logging information for logging the accountable transactions comprising a transaction valuation, in dependence on information contained in the token; and iii) selectively communicate the accountable resource to the client in dependence on at least the verification of the authentication of the client based on at least the encrypted authentication information within the digest authentication header.

20. A system, comprising:

a) at least one network interface, configured to communicate with each of (i) a central validation server, and (ii) a plurality of clients;

b) a database representing client-associated account registration information; and c) at least one processor, configured to:

i) generate a response to a token comprising encrypted authentication information within a digest authentication header received from the central validation server relating to a pending accountable transaction involving a client and a provider, the generated response being dependent on authentication of the token based on at least encrypted authentication information contained within the digest authentication header, comprising client authentication information and a transaction valuation parameter;

ii) settle a transaction with the provider with respect to the accountable transaction conducted between the provider and the client; and iii) account for the settled transaction in the respective client-associated account maintained in the database.

* * * * *